United States Patent [19]

Zahn

[11] 4,058,845

[45] Nov. 15, 1977

[54] SCANNING DEVICE FOR HELICAL TYPE VIDEO TAPE RECORDER

[75] Inventor: Heinrich Zahn, Rossdorf, Germany

[73] Assignee: Robert Bosch GmbH, Stuttgart, Germany

[21] Appl. No.: 688,627

[22] Filed: May 21, 1976

[30] Foreign Application Priority Data

May 23, 1975 Germany .............................. 2522900

[51] Int. Cl.² ...................... G11B 21/18; G11B 21/24; G11B 5/52
[52] U.S. Cl. ..................................... 360/107; 360/109
[58] Field of Search ................ 360/130, 107, 108, 109

[56] References Cited

U.S. PATENT DOCUMENTS

| 3,422,230 | 1/1969 | Tanigawa et al. | 360/108 |
| 3,679,838 | 7/1972 | Salcedo et al. | 360/107 |
| 3,679,840 | 7/1972 | Maxey | 360/130 |
| 3,981,024 | 9/1976 | Mo et al. | 360/130 |
| 3,995,317 | 11/1976 | Schmidt | 360/130 |

*Primary Examiner*—Robert S. Tupper
*Attorney, Agent, or Firm*—Ernest F. Marmorek

[57] ABSTRACT

Matching reference surfaces which are provided on the head wheel and the shaft of a driving motor to allow easy interchangeability and alignment of the head wheel in a scanning device for a magnetic tape instrument.

2 Claims, 1 Drawing Figure

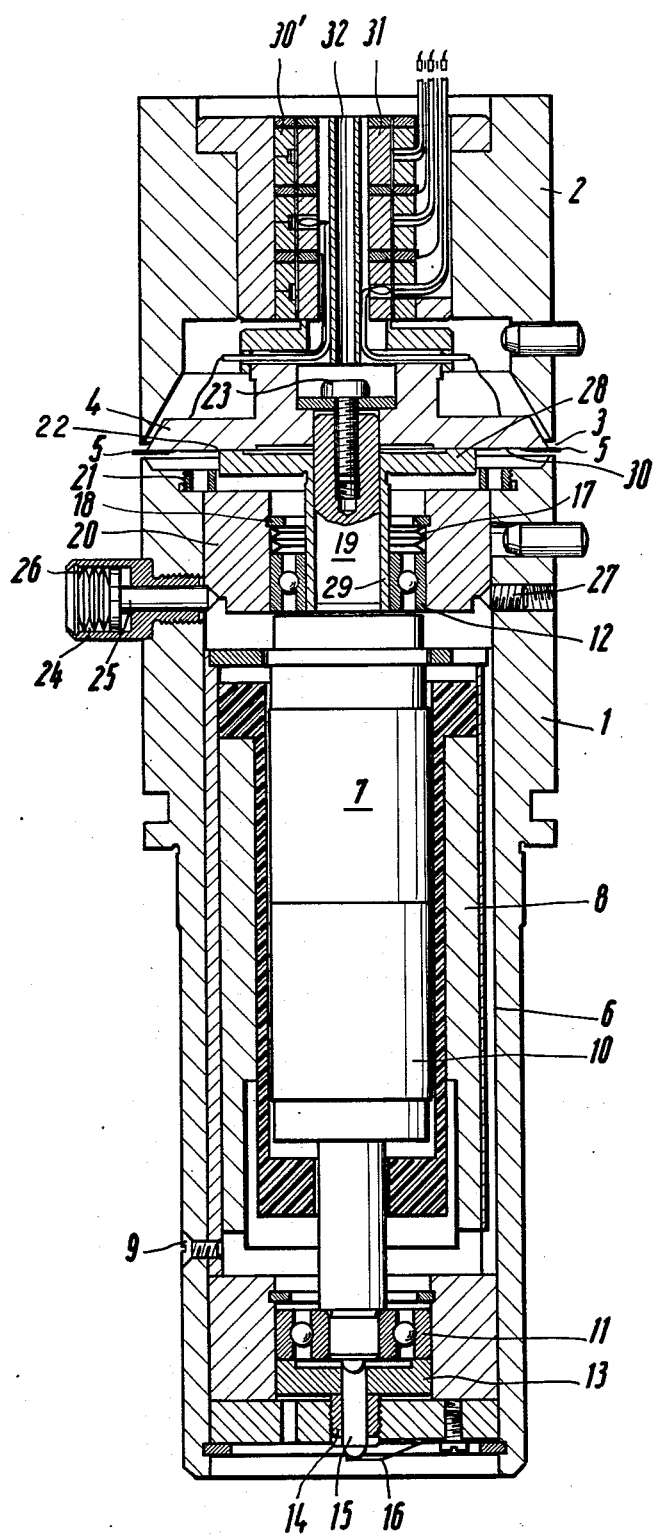

SCANNING DEVICE FOR HELICAL TYPE VIDEO TAPE RECORDER

CROSS-REFERENCE TO RELATED APPLICATIONS

Reference is had to the patent to Rudolf Prochnow, U.S. Pat. No. 3,666,894, issued May 30, 1972. Reference is also had to the following co-pending applications: Ser. No. 616,808 by Rudolf Prochnow et al., filed Sept. 25, 1975; Ser. No. 669,347 by Rudolf Prochnow, filed on Mar. 22, 1976; Ser. No. 604,626 by Peter Gunschmann, filed Aug. 14, 1975; and Ser. No. 685,381 filed on May 11, 1976 by Peter Gunschmann. The assignee of the applications is the same as the assignee of the instant application: Robert Bosh GmbH. The assignee of the issued patent is a predecessor of the assignee of the instant application.

SUMMARY OF THE INVENTION

The invention relates to a scanning device for a magnetic tape instrument with diagonal tracking scanning, wherein there is a head wheel having at least one magnetic head and being driven by a head wheel motor. This motorhead wheel assembly is housed in a two-part casing or stationary guide drum.

The invention relates more particularly to adjustable assembly elements for assembling and adjusting the head wheel-motor assembly with the stationary guide drum housing.

To realize the required high relative velocities between the electromagnetic transducers or magnetic tape heads and the magnetic tape, as is required in the case of retrieval of wide band magnetic signals from recording tape, scanning systems have been developed wherein the magnetic heads which are arranged at the periphery of rapidly revolving head wheels, scan the relatively slower moving magnetic tape at an angle with respect to the center line of the tape. The stored information is applied to the magnetic tape in a series of parallel track segments closely spaced apart from one another; the information being retrieved using a similar system to that used for the recording process, as is known.

Because of the high rate of speed at which the magnetic heads move over the magnetic tape, in order to facilitate optimum signal transfer, close contact between the magnetic heads and the magnetic tape must be maintained.

As a result of both the considerable pressure exerted by the magnetic heads on the magnetic tape and the high velocity with which the head wheel slides the magnetic heads over the magnetic tape, the mechanical tolerances within which the scanning device must be maintained, are rapidly exceeded. In practice, it becomes frequently necessary to change worn magnetic heads for new ones. Because of the high degree of accuracy with which the magnetic heads must be arranged with respect to the head disc, the changing of the magnetic heads alone will not normally result in a properly aligned scanning device. Normally, the head disc must be renewed and the magnetic heads readjusted.

To accomplish the proper relative adjustment between the magnetic heads and the head disc, the head wheel on which the magnetic heads are mounted must be detached from the driving motor shaft, and after alignment, reattached to the motor. Because of the high precision with which the mechanical tolerances must be maintained, it has been the usual practice to have these operations carried out at the manufacturer's plant, with the attendant losses in time and considerable costs. As the shaft to which the head wheel is secured is normally the motor shaft of the driving motor, it was necessary to practically dismantle the entire scanning device to accomplish the exchange of magnetic heads.

It is therefore one of the principal objects of the invention to provide a construction of a head wheel mounting which makes possible an easy, quick and relatively reliable change of the head wheel.

Further objects and advantages of the invention will be set forth in part in the following specification and in part will be obvious therefrom without being specifically referred to, the same being realized and attained as pointed out in the claims hereof.

Other objects of the invention will in part be obvious and will in part appear hereinafter.

With the above and other objects of the invention in view, the invention consists in the novel construction, arrangement and combination of various devices, elements and parts, as set forth in the claims hereof, one embodiment of the same being illustrated in the accompanying drawings and described in the specification.

The invention accordingly comprises the features of construction, combination of elements and arrangement of parts which will be exemplified in a construction hereinafter set forth and the scope of the application of which will be indicated in the claims.

BRIEF DESCRIPTION OF THE DRAWING

For a fuller understanding of the nature and objects of the invention, reference should be had to the following detailed description, taken in connection with the accompanying drawing, in which the sole FIGURE of the drawing is a sectional view of a scanning device including the instant invention.

DESCRIPTION OF THE PREFERRED EMBODIMENT

In implementing the invention in the embodiment which has been selected for illustration in the accompanying drawing and for description in the specification, and referring particularly to the sole FIGURE of the drawing, the housing or stationary guide drum is formed in two parts; a lower portion 1 and an upper portion 2. Between these two portions there is formed a slit or separation 3 within which the head wheel 4 carrying the magnetic heads 5 mounted on its periphery, rotates concentrically with respect to the two guide drum portions 1, 2. The lower portion 1 of the guide drum contains the head wheel or driving motor 7 in a cylindrical bore hole 6. The stationary portion or casing 8 of the head wheel or driving motor 7 is slid into the bore hole 6 and normally secured therein by means of three countersunk screws 9, displaced by 120° with respect to each other.

The rotor 10 of the head wheel motor 7 is rotatably supported by the lower bearing 11 and the upper bearing 12. The bearings 11, 12 are normally of the ball-bearing or similar type having an inner collar or assembly secured to the rotating portion of the motor, or rotor 10 and an outer stationary part.

The adjustment of the path through which the magnetic heads 5 mounted on head wheel 4 follow, is accomplished by adjusting the relative positions of the bearings 11, 12 with respect to the casing or stationary guide drums 1 and 2. The lower bearing 12 can be vertically adjusted by means of a pressure disc or thrust washer 13 and the headless screw, or threaded rod or pin 14. A ground connection pin 15 and a leaf-type spring 16 are normally provided to ground the rotor 10 electrically to the housing, to thereby reduce electrical disturbances caused by grounding the rotor 10 through the ball-bearings 11, 12. The upper bearing 12 of the rotor 10 is maintained under tension in the longitudinal direction by means of cup-spring units 17 acting against the outer ring of bearing 12 and against a retaining ring 18. The outer ring or stationary portion of bearing 12 is inserted into a jacket 20 to form a larger stationary unit part of the bearing, the latter being contained in bore hole 6 by means of a threaded ring 21.

To obtain a high degree of information transfer from the magnetic tape, which is moved around the outside of the periphery of the guide drums 1, 2, it is necessary that the axis of rotation of the head wheel 4 coincide very closely with the longitudinal or central axis of the guide drum portions 1, 2. During contact with the magnetic tape, it is necessary that each of the two magnetic heads 5 describe as perfect a concentric path with respect to the cylinder surface of the guide drum portions 1, 2, as possible.

In order to ensure that the path of the magnetic heads is accurate, it is necessary that the driving flange 28 be properly fitted and aligned with the shaft 19 of the motor 7, by means of the sleeve 29. The driven bearing or reference surface 22 must be precisely and accurately formed on the driving flange 28. A matching driven reference surface or face is formed on the head wheel. The driven and driving reference surfaces 22, 30 together form a transmission through which the head wheel 4 is driven by the motor 7. In practice, in order to reduce the errors resulting from machining the various parts, the sleeve 29 carrying the flange 28 is disposed on the shaft 19 of the motor 7. This assembly is thereafter machined as a unit to avoid errors inherent in machining each part separately and then assembling it.

It is preferred that the driving reference surface 22 have an external diameter of at least one-half the driven reference surface 30. This helps provide better support and ensure that the heads 5, which are mounted on the driven bearing surface 30, are carried in a substantially wobble-free circular path.

As a result of the provision of a driven and a driving reference surface 30 and 22, respectively, the head wheel 4 may be removed from the unit and replaced so that the magnetic heads 5 will assuredly be properly aligned. The head wheel 4 may be exchanged for another head wheel having new magnetic heads 5, when such an exchange becomes necessary due to deterioration of the magnetic heads 5.

A central fastening device is provided for securing the head wheel 4 to the shaft 19 of the motor 7. This ensures consistent radial alignment of the head 4 on the flange 28. The central fastening device is preferably a threaded rod or screw 23 which can be driven into a threaded bore provided in the end of shaft 19.

Provision for centering the head wheel 4 with respect to the cylindrical surface of the guide drums 1, 2, so that the axis of rotation of the head wheel 4 will substantially coincide with the central axis of the guide drums 1, 2 is as follows:

Three headless screws, threaded rods, pins or similar devices 25, 27, are provided in threaded bore holes in the lower portion of the guide drum 1.

The three threaded bores are preferably equally spaced about the lower portion 1 and are extending therethrough. When the threaded rods or similar devices 27, 24 are inserted through the bores, their inner ends abut the jacket 20 provided on the upper bearing 12. By adjusting the distance by which each of the threaded devices 24, 27 extend into the lower portion 1, the position of the upper bearing 12 can be adjusted. It is noted that the drawing shows the threaded device 24 and the threaded device 27 in the same plane; however, this is done for the sake of clarity in order to show these devices. Normally they would be disposed 120° from each other and would therefore not be the same plane.

One of the threaded devices 24 is equipped with a rod 25, and is prestressed by a spring 26, whereby the device resiliently holds the jacket 20 in place. This permits resilient displacement of the jacket 20 towards the center, with respect to the device 24. The threaded rods 27 are not resilient in their adjustment.

Shown disposed above the head wheel 4 in the drawing is a signal-transferring member consisting of a stationary part 30', and of a rotatable part 31 which, in turn, revolves with the head wheel 4. The part 31 is screwed together with the head wheel 4 and has a longitudinal bore hole 32 through which the central fastening device or screw 23 can be tightened or loosened. When loosened, the head of the screw 23 can be tightened against a lower shoulder of the transferring member 31 and lifts the transferring member 31 upwardly together with the head wheel 4 to which it is attached. To remove the head wheel 4 and to install another one in its place, the guide drum portion 2, after loosening of a fastening means (not shown) must first be lifted upward from the device.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a scanning device, for use in a magnetic tape instrument of the type using magnetic heads and diagonal track scanning with the magnetic tape following a path over the scanning device, and comprising an outer two-part stationary guide drum having a central axis and supporting an inner head assembly revolving about an axis of rotation, and including a head-wheel supporting the magnetic heads and a motor having a driving shaft, the improvement comprising:

transmission means operable to couple said driving shaft with said head-wheel, comprising a sleeve disposed on said driving shaft, and a driving flange connected to said sleeve and defining a surface disposed in a plane substantially perpendicular to said axis of rotation, said head-wheel defining a face normally disposed in a plane substantially perpendicular to the axis of rotation and operable to be aligned in abutment with and frictionally engaged by said surface, both said surface and said head-wheel being substantially circular in shape, said surface having an external diameter of at least one-half the outer diameter of said head-wheel, the magnetic heads being disposed on said face, said transmission means including a ball bearing supporting at least partially said inner head assembly, a rotatably mounted inner ring, said sleeve being supported by said inner ring, an outer threaded ring, and a jacket encompassing said bearing and abutting said threaded ring, said threaded ring and said jacket being located within one of said two-part stationary guide drums whereby said driving flange will drive said head-wheel when the motor is activated.

2. A scanning device according to claim 1, further comprising a plurality of yieldably resilient means interposed between said inner ring and said ball bearing, and acting against said inner ring.

* * * * *